United States Patent
Takabatake et al.

(10) Patent No.: US 11,560,058 B2
(45) Date of Patent: Jan. 24, 2023

(54) VEHICLE DISPLAY CONTROL DEVICE, VEHICLE DISPLAY CONTROL METHOD, COMPUTER-READABLE STORAGE MEDIUM, AND VEHICLE DISPLAY SYSTEM FOR DISPLAYING ACTION SCHEDULE ITEM

(71) Applicant: TOYOTA JIDOSHA KABUSHIKI KAISHA, Toyota (JP)

(72) Inventors: Satoaki Takabatake, Nissin (JP); Junji Miyazaki, Nagoya (JP); Koji Kimura, Nagoya (JP); Yuki Yoshida, Toyota (JP); Ryo Ogata, Toyota (JP); Tadashi Morishita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/398,046

(22) Filed: Aug. 10, 2021

(65) Prior Publication Data
US 2022/0063407 A1 Mar. 3, 2022

(30) Foreign Application Priority Data
Aug. 31, 2020 (JP) .............................. JP2020-146334

(51) Int. Cl.
*B60K 35/00* (2006.01)
*G06T 11/00* (2006.01)
(Continued)

(52) U.S. Cl.
CPC ............ *B60K 35/00* (2013.01); *G06F 3/1423* (2013.01); *G06T 3/40* (2013.01); *G06T 11/001* (2013.01);
(Continued)

(58) Field of Classification Search
None
See application file for complete search history.

(56) References Cited

U.S. PATENT DOCUMENTS 6,115,482 A * 9/2000 Sears ................... G09B 21/001
382/173
8,260,482 B1 * 9/2012 Szybalski ............. B60W 10/04
701/410
(Continued)

FOREIGN PATENT DOCUMENTS

JP 2018-100867 A 6/2018

OTHER PUBLICATIONS

HWatch Tesla Model 3 Navigateon Autopilot: New UI Images + Videosttps://insideevs.com/news/340884/watch-tesla-model-3-navigate-on-autopilot-new-ui-images-videos/ Nov. 4, 2018 at 11:40am ET.*

(Continued)

*Primary Examiner* — Jason A Pringle-Parker
(74) *Attorney, Agent, or Firm* — Oliff PLC

(57) ABSTRACT

The action schedule item creation ECU creates action schedule items demanded of an ego vehicle capable of switching between autonomous driving and manual driving. The HUD and the meter display are provided inside a cabin of the ego vehicle. The display control ECU displays the action schedule items created by the action schedule item creation ECU on the HUD and the meter display, and emphasizes display of action schedule items to be performed by manual driving compared to display of action schedule items to be performed by autonomous driving.

14 Claims, 13 Drawing Sheets

(51) Int. Cl.
*G06F 3/14* (2006.01)
*G06T 3/40* (2006.01)

(52) U.S. Cl.
CPC ............... *B60K 2370/1529* (2019.05); *B60K 2370/168* (2019.05); *B60K 2370/175* (2019.05); *B60K 2370/188* (2019.05); *B60K 2370/1868* (2019.05); *B60K 2370/191* (2019.05)

(56) References Cited

U.S. PATENT DOCUMENTS

| | | | | |
|---|---|---|---|---|
| 9,519,287 | B1* | 12/2016 | Szybalski | B60W 50/14 |
| 10,235,122 | B1* | 3/2019 | Goel | G06V 20/56 |
| 10,627,813 | B2* | 4/2020 | Tsuji | B60W 10/06 |
| 2003/0146941 | A1* | 8/2003 | Bailey | G06F 3/0482 |
| | | | | 715/830 |
| 2010/0220250 | A1* | 9/2010 | Vanderwall | G01C 21/3688 |
| | | | | 455/152.1 |
| 2014/0077942 | A1* | 3/2014 | Jayamohan | B60K 35/00 |
| | | | | 340/441 |
| 2016/0311323 | A1* | 10/2016 | Lee | B60K 37/06 |
| 2017/0169208 | A1* | 6/2017 | Jantz | G06F 21/44 |
| 2017/0228126 | A1* | 8/2017 | Kim | B60Q 3/14 |
| 2017/0291544 | A1* | 10/2017 | Ishihara | G06F 3/0304 |
| 2018/0217717 | A1* | 8/2018 | Yasuda | G06F 3/0488 |
| 2019/0241198 | A1* | 8/2019 | Mori | G08G 1/16 |
| 2020/0026397 | A1* | 1/2020 | Wohlstadter | G06F 3/0482 |
| 2020/0298994 | A1* | 9/2020 | Conaway | B64D 43/00 |
| 2021/0162865 | A1* | 6/2021 | Ogata | B60W 50/14 |
| 2022/0016979 | A1* | 1/2022 | Cho | G06T 3/40 |
| 2022/0063407 | A1* | 3/2022 | Takabatake | B60K 35/00 |

OTHER PUBLICATIONS

U.S. Appl. No. 17/032,828.

* cited by examiner

VEHICLE DISPLAY CONTROL DEVICE, VEHICLE DISPLAY CONTROL METHOD, COMPUTER-READABLE STORAGE MEDIUM, AND VEHICLE DISPLAY SYSTEM FOR DISPLAYING ACTION SCHEDULE ITEM

CROSS-REFERENCE TO RELATED APPLICATION

This application is based on and claims priority under 35 USC 119 from Japanese Patent Application No. 2020-146334 filed on Aug. 31, 2020, the disclosure of which is incorporated by reference herein.

TECHNICAL FIELD

The present disclosure relates to a vehicle display control device, a vehicle display control method, a computer-readable storage medium, and a vehicle display system.

Related Art

Japanese Patent Application Laid-Open (JP-A) No. 2018-100867 (Patent Document 1) discloses technology for displaying an autonomous driving segment and a manual driving segment in an identifiable manner, and also displaying information indicating vehicle behavior in the autonomous driving segment when displaying a route leading a vehicle to a destination on a display.

In vehicles capable of switching between autonomous driving and manual driving, an occupant must reliably be made aware of a timing at which operation by the occupant is required in order to achieve a smooth switch between autonomous driving and manual driving. In the technology of Patent Document 1, display of autonomous driving segments is emphasized relative to display of manual driving segments, and so there is room for improvement with respect to making the occupant aware of a timing at which operation by the occupant is required.

SUMMARY

In consideration of the above circumstances, an object of the present disclosure is to obtain a vehicle display control device, a vehicle display control method, a computer-readable storage medium, and a vehicle display system capable of easily making an occupant aware of a timing at which operation by the occupant is required.

A vehicle display control device according to a first aspect includes a display control section configured to display an action schedule item created by a creation section configured to create an action schedule item demanded of a vehicle capable of switching between autonomous driving and manual driving on a display section provided inside a cabin of the vehicle, and to emphasize display of the action schedule item to be performed by manual driving compared to display of the action schedule item to be performed by autonomous driving.

In the first aspect, the action schedule item demanded of the vehicle that is capable of switching between autonomous driving and manual driving is created by the creation section. The display control section displays the action schedule item created by the creation section on the display section provided inside the cabin of the vehicle, and emphasizes display of the action schedule item to be performed by manual driving compared to display of the action schedule item to be performed by autonomous driving. Emphasizing display of the action schedule item to be performed by manual driving in this manner enables an occupant to be easily made aware of a timing at which operation by the occupant is required.

A second aspect is the first aspect, wherein the display control section is further configured to display the action schedule item on the display section using information including a text string, and to emphasize display of the action schedule item to be performed by manual driving relative to display of the action schedule item to be performed by autonomous driving by inverting a color of the text string and a color of a background portion of the text string.

The second aspect enables the occupant to be clearly made aware of the distinction between autonomous driving and manual driving using a limited color palette. Moreover, even in cases in which screen contrast is difficult to secure for optical reasons (such as in cases in which the display section is an HUD), the occupant can be easily made aware of a timing at which operation by the occupant is required.

A third aspect is the second aspect, wherein the display control section is further configured to emphasize display of the action schedule item to be performed by manual driving relative to display of the action schedule item to be performed by autonomous driving by setting a color of a background portion of the text string that is a portion inside a frame surrounding the text string differently from a color of the text string and differently from a color of a background of at least a region of a display region of the display section in which the text string is displayed.

The third aspect enables display of action schedule items to be performed by manual driving to be emphasized using a limited color palette.

A fourth aspect is the first aspect, wherein the display section includes a meter display and a head-up display. The display control section is further configured to display the action schedule item on the display section using information including a text string, and in the case of the meter display, emphasize display of the action schedule item to be performed by manual driving relative to display of the action schedule item to be performed by autonomous driving by changing a color of at least one out the text string or a background portion of the text string, and in the case of the head-up display, emphasize display of the action schedule item to be performed by manual driving relative to display of the action schedule item to be performed by autonomous driving by inverting a color of the text string and a color of a background portion of the text string.

The fourth aspect enables display to be emphasized in a manner corresponding to the respective characteristics of the meter display for which colors can be changed relatively simply, and of the HUD that has a limited color palette.

A fifth aspect is any one of the first aspect to the fourth aspect, wherein the display control section is further configured to display on the display section a display indicating an end to manual driving in cases in which a site of an action schedule item performed manually by an occupant has been passed or a duration of an action schedule item performed manually by the occupant has been exceeded.

In the fifth aspect, the end to manual driving is clearly conveyed, enabling the occupant to cease their operation with confidence.

A sixth aspect is any one of the first aspect to the fifth aspect, wherein the creation section is configured to create an action plan including plural of the action schedule items. The display section includes a first display section and a second display section. Out of the action plan, the display control section is further configured to display on the first display section an action schedule item for which a distance to a site where the action is to be performed or a time until the action is to be performed is not greater than a first specified value, and to display on the second display section an action schedule item for which a distance to a site where the action is to be performed or a time until the action is to be performed is not greater than a second specified value that is smaller than the first specified value.

In the sixth aspect, dividing display of the most imminent action schedule item and the subsequent action schedule item between the two display sections enables the occupant to be easily made aware of the action schedule items.

A seventh aspect is the sixth aspect, wherein the first display section is a meter display, and the second display section is a head-up display.

The seventh aspect enables the amount by which the occupant has to shift their gaze in order to view the first display section or the second display section to be minimized.

An eighth aspect is any one of the first aspect to the seventh aspect, wherein the creation section is configured to create an action plan including plural of the action schedule items. In cases in which there are plural of the action schedule items to display on the display section, the display control section is configured to perform enlarged display of an action schedule item having the shortest distance to a site where the action is to be performed or the shortest time until the action relative to other action schedule items.

The eighth aspect enables the occupant to be easily made aware of the closest action schedule item, this being the highest priority, regardless of whether this action schedule item relates to autonomous driving or manual driving.

In a vehicle display control method according to a ninth aspect, a computer executes processing. The processing includes displaying an action schedule item created by a creation section configured to create an action schedule item demanded of a vehicle capable of switching between autonomous driving and manual driving on a display section provided inside a cabin of the vehicle, and emphasizing display of the action schedule item to be performed by manual driving compared to display of the action schedule item to be performed by autonomous driving.

The ninth aspect enables the occupant to be easily made aware of a timing at which operation by the occupant is required.

A non-transitory computer readable storage medium according to a tenth aspect is stored with a vehicle display control program that causes a computer to execute processing. The processing includes displaying an action schedule item created by a creation section configured to create an action schedule item demanded of a vehicle capable of switching between autonomous driving and manual driving on a display section provided inside a cabin of the vehicle, and emphasizing display of the action schedule item to be performed by manual driving compared to display of the action schedule item to be performed by autonomous driving.

The tenth aspect enables the occupant to be easily made aware of a timing at which operation by the occupant is required.

A vehicle display system according to an eleventh aspect includes: a creation section configured to create an action schedule item demanded of a vehicle capable of switching between autonomous driving and manual driving; a display section provided inside a cabin of the vehicle; and a display control section configured to display the action schedule item created by the creation section on the display section, and to emphasize display of the action schedule item to be performed by manual driving compared to display of the action schedule item to be performed by autonomous driving.

The eleventh aspect enables the occupant to be easily made aware of a timing at which operation by the occupant is required.

The present disclosure exhibits an advantageous effect of enabling an occupant to be easily made aware of a timing at which operation by the occupant is required.

DETAILED DESCRIPTION

Figure 1:
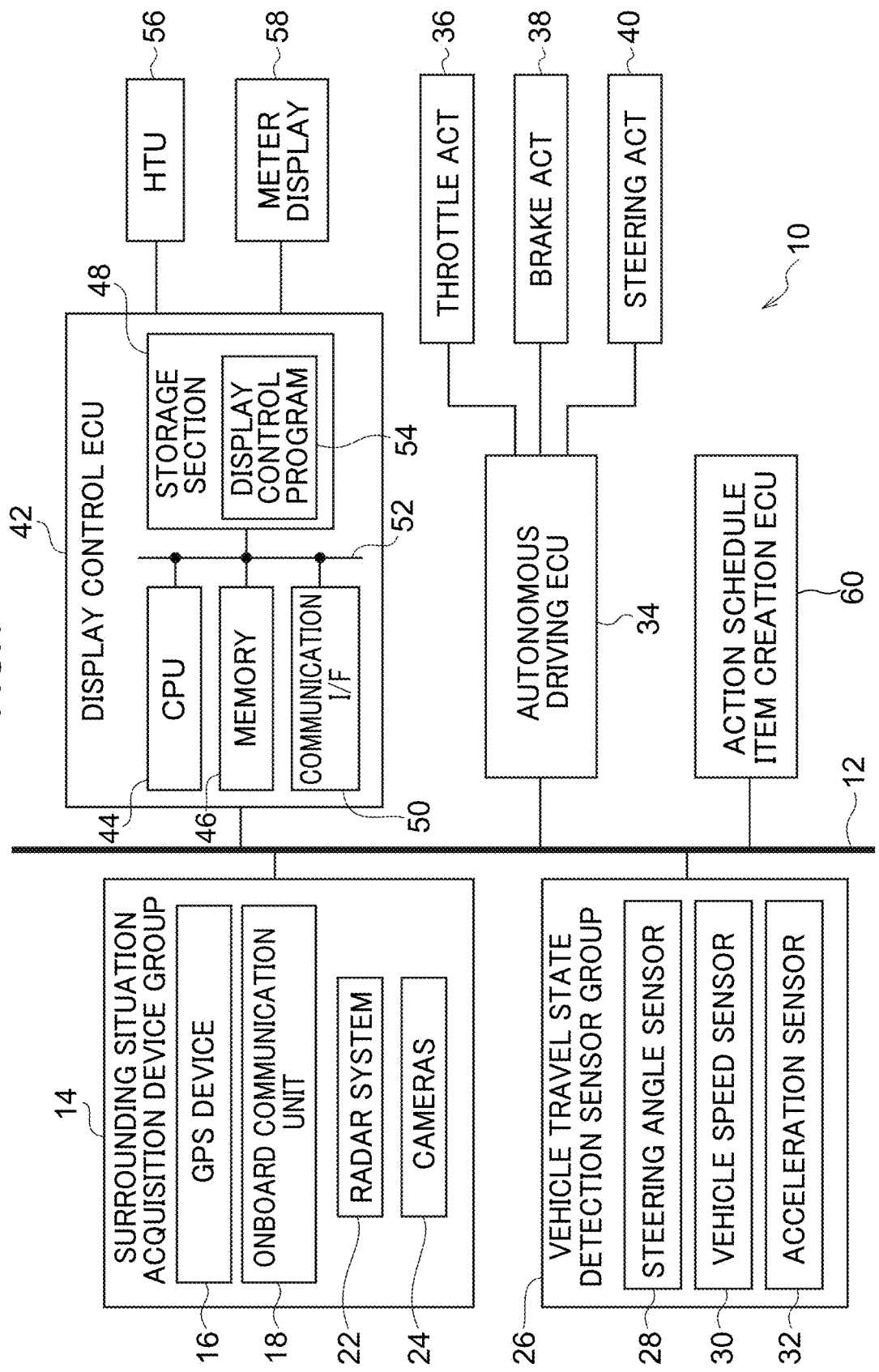
FIG. 1 is a block diagram illustrating a schematic configuration of an onboard system according to an exemplary embodiment.

Detailed explanation follows regarding an example of an exemplary embodiment of the present disclosure, with reference to the drawings. As illustrated in FIG. 1, an onboard system 10 includes a communication bus 12. A surrounding situation acquisition device group 14, a vehicle travel state detection sensor group 26, an autonomous driving electronic control unit (ECU) 34, an action schedule item creation ECU 60, and a display control ECU 42 are respectively connected to the communication bus 12. Note that the onboard system 10 is only partially illustrated in FIG. 1. A vehicle installed with the onboard system 10 is hereafter referred to as the ego vehicle. As will be described later, the ego vehicle is capable of switching between autonomous driving and manual driving.

The surrounding situation acquisition device group 14 includes devices for acquiring information indicating the situation in the peripheral environment of the ego vehicle, including a global positioning system (GPS) device 16, an onboard communication unit 18, a radar system 22, cameras 24, and the like.

The GPS device 16 receives GPS signals from plural GPS satellites in order to find the position of the ego vehicle. The greater the number of GPS signals the GPS device 16 can receive, the better the positioning accuracy. The onboard communication unit 18 is a communication device that performs at least one out of vehicle-to-vehicle communication with other vehicles, or road-to-vehicle communication with roadside equipment.

The radar system 22 is configured of plural radar devices, each with a different detection range. The radar system 22 detects objects such as pedestrians and other vehicles present in the periphery of the ego vehicle as point cloud data, and acquires relative positions and relative speeds of the detected objects with respect to the ego vehicle. The radar system 22 includes an inbuilt processing device that processes search results regarding peripheral objects. The processing device employs changes in the relative position and relative speed of each object included in plural most recent search results in order to exclude noise and roadside objects such as guardrails from monitoring targets, and to track specific objects such as pedestrians and other vehicles as monitoring targets. The radar system 22 then outputs information such as the relative position and relative speed of each of the monitoring target objects. The cameras 24 are configured of plural cameras that image the periphery of the ego vehicle and output the captured images.

The vehicle travel state detection sensor group 26 is configured of plural sensors for acquiring a travel state of the vehicle, including a steering angle sensor 28 that detects the steering angle of the ego vehicle, a vehicle speed sensor 30 that detects the travel speed of the ego vehicle, and an acceleration sensor 32 that detects an acceleration rate of the ego vehicle.

A throttle actuator (ACT) 36 that changes the throttle position of the ego vehicle, and a brake ACT 38 that changes braking force generated by a braking device of the ego vehicle are connected to the autonomous driving ECU 34. A steering ACT 40 that changes a steering amount of a steering device of the ego vehicle is also connected to the autonomous driving ECU 34.

The autonomous driving ECU 34 includes a central processing unit (CPU), memory such as read only memory (ROM) and random access memory (RAM), a non-volatile storage section such as a hard disk drive (HDD) or a solid state drive (SSD), and a communication interface (I/F). Autonomous driving software is stored in the storage section. When an autonomous driving mode has been selected, the CPU executes the autonomous driving software such that the autonomous driving ECU 34 performs autonomous driving processing to cause the ego vehicle to travel autonomously without requiring an occupant of the ego vehicle to perform a driving operation. The autonomous driving processing is processing to determine the situation of the ego vehicle and its surroundings based on information obtained from the surrounding situation acquisition device group 14 and the vehicle travel state detection sensor group 26, and to control the throttle ACT 36, the brake ACT 38, and the steering ACT 40 accordingly.

As described above, during autonomous driving in the present exemplary embodiment, the ego vehicle travels autonomously without requiring the occupant of the ego vehicle to perform a driving operation. In the present exemplary embodiment, manual driving includes cases in which the autonomous driving ECU 34 performs some driving operations while the remaining driving operations are executed by the occupant of the ego vehicle. As an example, in a manual driving mode, the autonomous driving ECU 34 may adjust the speed, while the occupant of the ego vehicle only performs a steering operation.

The action schedule item creation ECU 60 includes a CPU, memory such as ROM and RAM, a non-volatile storage section such as a HDD or SSD, and a communication I/F. The storage section is stored with map information. The action schedule item creation ECU 60 creates action schedule items demanded of the vehicle. Namely, when a destination of the ego vehicle has been set, the action schedule item creation ECU 60 compares a current position of the ego vehicle as obtained from the GPS device 16 and a destination position of the ego vehicle against the map information in order to find a route to the destination.

The action schedule item creation ECU 60 also divides the found route (an action plan of the ego vehicle) into action schedule items such as left and right turns, lane changes, merges, and so on, and decides whether the scheduled action in each of the action schedule items thus divided is to be performed by autonomous driving or manual driving. In the present exemplary embodiment, scheduled actions are basically performed by autonomous driving by the autonomous driving ECU 34, but for actions that are challenging for autonomous driving, such as a "merge" action scheduled at a location where there is only a short merging lane, a decision is made that this will be performed by manual driving.

Individual action schedule items included in the action plan include information indicating the scheduled action, such as a left or right turn or a lane change, information indicating whether this action is to be performed by autonomous driving or manual driving, and information indicating the scheduled location of this action (for example in latitude and longitude notation). The action plan created by the action schedule item creation ECU 60 is transmitted to the autonomous driving ECU 34 and the display control ECU 42. The action schedule item creation ECU 60 functions as an example of a creation section.

The display control ECU 42 includes a CPU 44, memory 46 such as ROM and RAM, a non-volatile storage section 48 such as a HDD or SSD, and a communication I/F 50. The CPU 44, the memory 46, the storage section 48, and the communication I/F 50 are connected together so as to be capable of communicating with each other through an internal bus 52. A display control program 54 is stored in the storage section 48. The display control ECU 42 reads the display control program 54 from the storage section 48 and expands the program in the memory 46, and the display control program 54 expanded in the memory 46 is executed by the CPU 44 in order to perform HUD display control processing and MET display control processing, described later. Note that the display control program 54 is an example of a vehicle display control program.

A head-up display (hereafter referred to as HUD) 56 and a meter display (hereafter referred to as MET) 58, both of which are provided in the cabin of the ego vehicle, are connected to the display control ECU 42. The HUD 56 according to the present exemplary embodiment is a small HUD, and is for example reflected on a windshield within a display range covering part of a forward field of view (an image toward the bottom of a scene ahead) of the occupant of the ego vehicle. The MET 58 is a display provided to an instrument panel of the ego vehicle. The display control ECU 42 controls the display of information on the HUD 56 and the MET 58.

Figure 2:
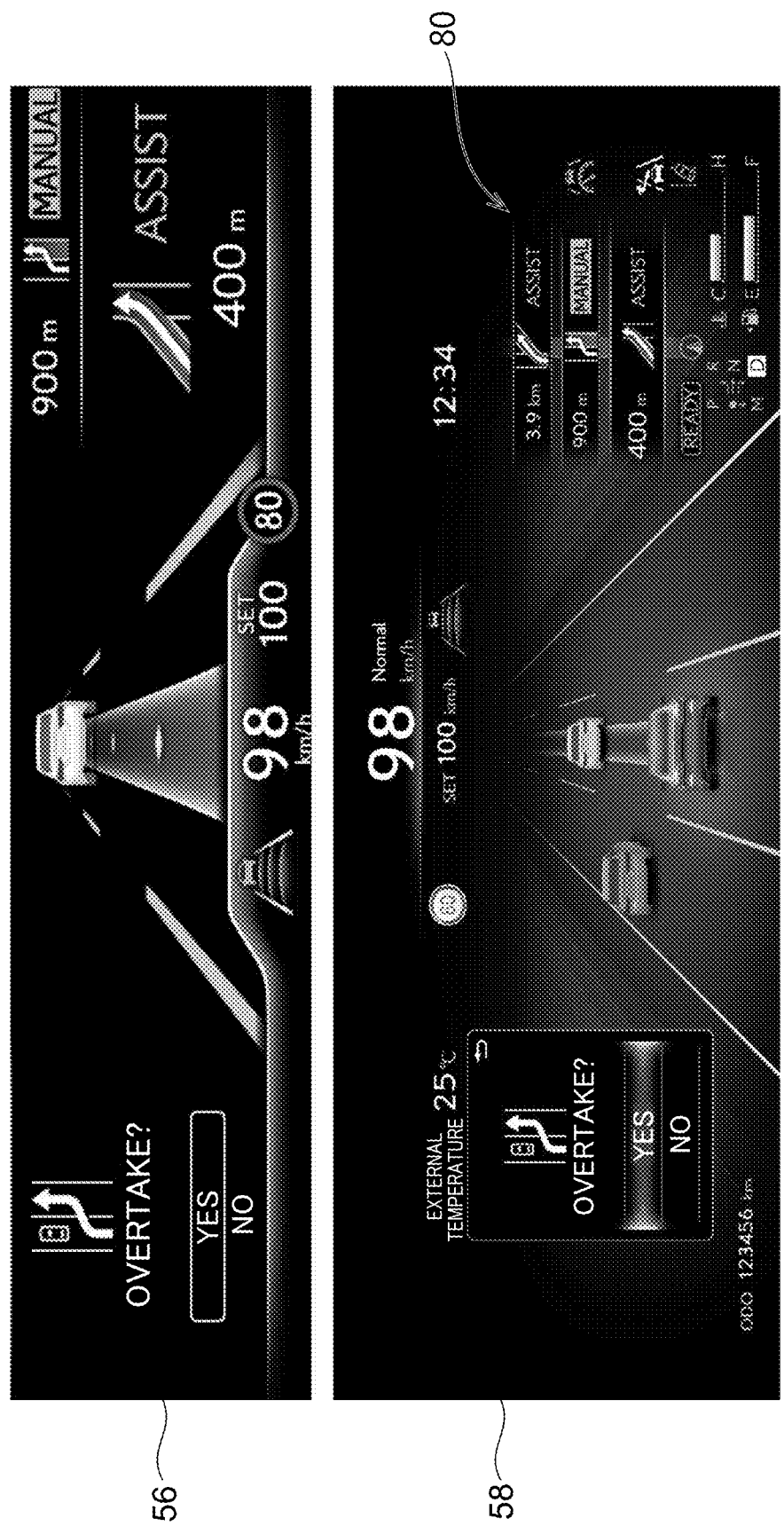
FIG. 2 is an image illustrating an example of display on an HUD and a MET.

Namely, the display control ECU 42 displays the action schedule items created by the action schedule item creation ECU 60 on the HUD 56 and the MET 58, and emphasizes display of action schedule items to be performed by manual driving compared to display of action schedule items to be performed by autonomous driving. Note that the display control ECU 42 is an example of a display control section and a vehicle display control device, and the HUD 56 and the MET 58 are examples of display sections. FIG. 2 illustrates an example of display on the HUD 56 and the MET 58. The HUD 56, the MET 58, the action schedule item creation ECU 60, and the display control ECU 42 configure an example of a vehicle display system.

Figure 3:
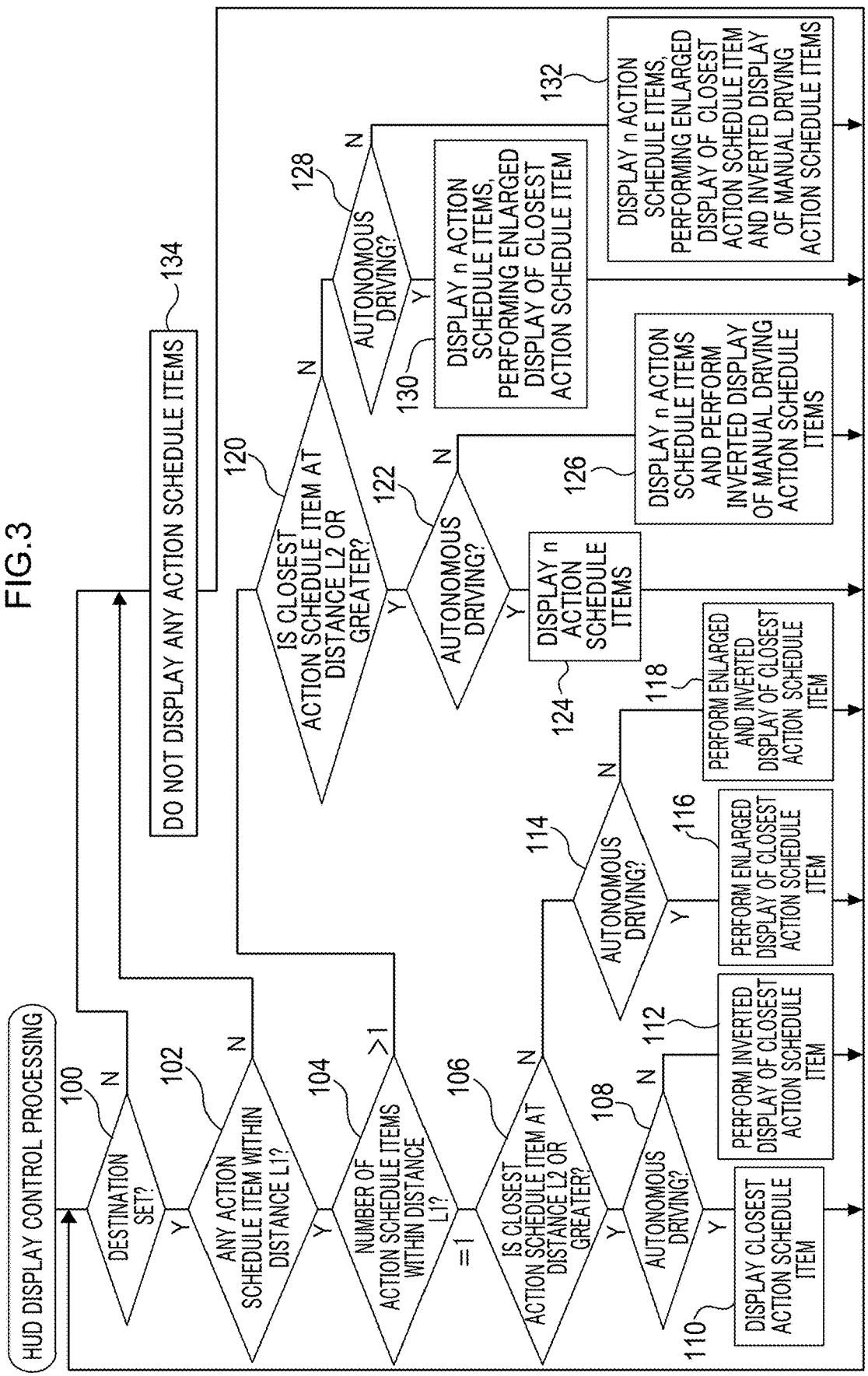
FIG. 3 is a flowchart illustrating an example of HUD display control processing.

Next, explanation follows regarding operation of the present exemplary embodiment. The display control ECU 42 performs the HUD display control processing illustrated in FIG. 3 while an ignition switch of the ego vehicle is on.

At step 100 of the HUD display control processing, the display control ECU 42 determines whether or not a destination of the ego vehicle has been set by the action schedule item creation ECU 60. In cases in which a destination of the ego vehicle has been set, the action schedule item creation ECU 60 creates an action plan of the ego vehicle including plural action schedule items, and transmits the action plan to the display control ECU 42 and the like. The display control ECU 42 accordingly makes the determination of step 100 based on whether or not an action plan of the ego vehicle including plural action schedule items has been received from the action schedule item creation ECU 60.

In cases in which determination is affirmative at step 100, processing transitions to step 102. At step 102, the display control ECU 42 references the action plan received from the action schedule item creation ECU 60, and determines whether or not the action plan includes any action schedule item for which the scheduled location of the action corresponds to a position within a distance L1 from the current position of the ego vehicle. The distance L1 is, for example, 10 km. The distance L1 is an example of a second specified value.

Figure 4:
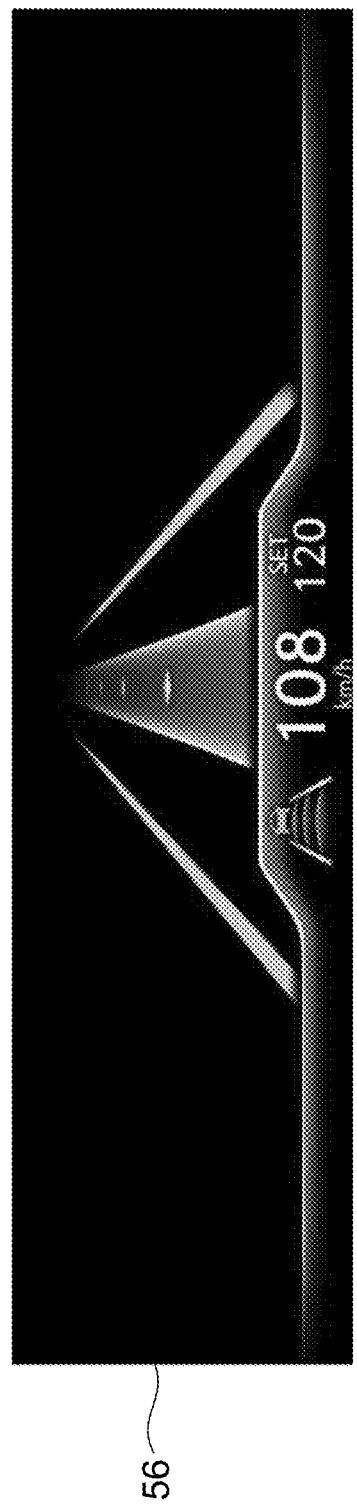
FIG. 4 is an image illustrating an example of display on an HUD.

In cases in which determination is negative at step 100 or step 102, processing transitions to step 134. At step 134, as illustrated in the example of FIG. 4, the display control ECU 42 does not display any action schedule items on the HUD 56. Following the processing of step 134, processing returns to step 100.

In cases in which determination is affirmative at step 102, processing transitions to step 104. At step 104, the display control ECU 42 determines the number of action schedule items included in the action plan for which the scheduled location of the action corresponds to a position within the distance L1 from the current position of the ego vehicle, and processing splits according to this determination result.

In cases in which the number of the action schedule items included in the action plan for which the scheduled location of the action corresponds to a position within the distance L1 from the current position of the ego vehicle is "1", processing transitions from step 104 to step 106. At step 106, the display control ECU 42 determines whether or not the single and closest action schedule item for which the scheduled location of the action corresponds to a position within the distance L1 from the current position of the ego vehicle is at a distance L2 or greater from the current position of the ego vehicle. The distance L2 is, for example, 1 km.

In cases in which determination is affirmative at step 106, processing transitions to step 108. At step 108, the display control ECU 42 determines whether or not the closest action schedule item is an action schedule item to be performed by autonomous driving. In cases in which determination is affirmative at step 108, processing transitions to step 110. At step 110, the display control ECU 42 displays a closest action schedule item 70 in an action schedule item display region of the HUD 56 (a region at the right edge of the display region of the HUD 56) as illustrated in the example of FIG. 5, and processing returns to step 100.

Figure 5:
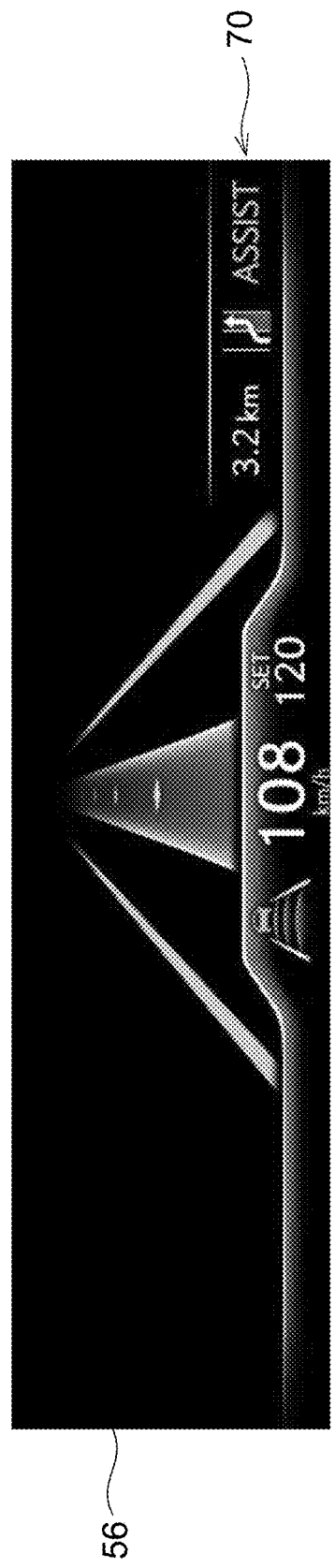
FIG. 5 is an image illustrating an example of display on an HUD.

The action schedule item 70 includes a first text string indicating the distance from the current position of the ego vehicle to the scheduled location of the action ("3.2 km" in the example of FIG. 5), and an icon indicating the scheduled action (a lane change in the example of FIG. 5). The closest action schedule item 70 further includes a second text string indicating whether the scheduled action is to be performed by autonomous driving or by manual driving ("ASSIST" to indicate autonomous driving in the example of FIG. 5). In the present exemplary embodiment, in cases in which "ASSIST" is displayed as the second text string to indicate autonomous driving, the second text string is displayed in a color with high brightness (for example white) and a background portion of the second text string (a portion inside a frame surrounding the second text string) is displayed in a color with low brightness (for example black).

Figure 6:
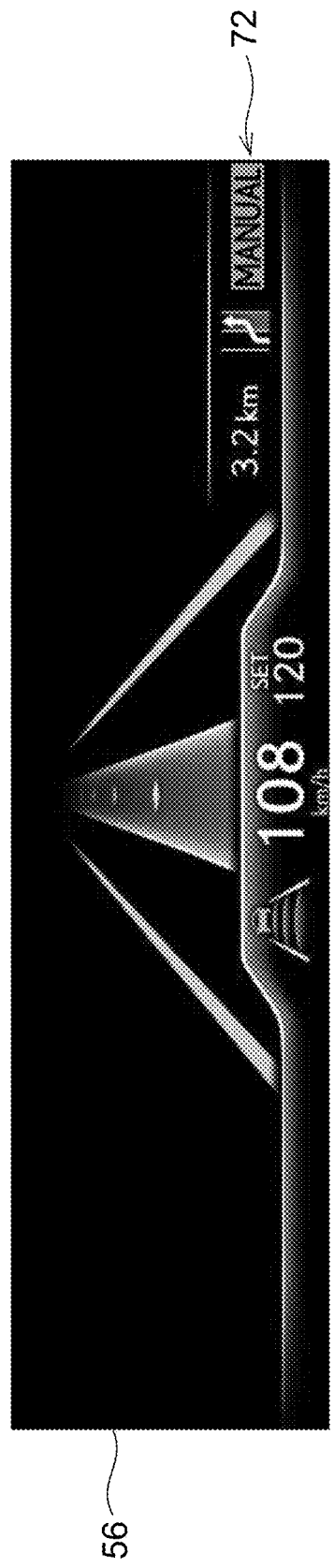
FIG. 6 is an image illustrating an example of display on an HUD.
Figure 7:
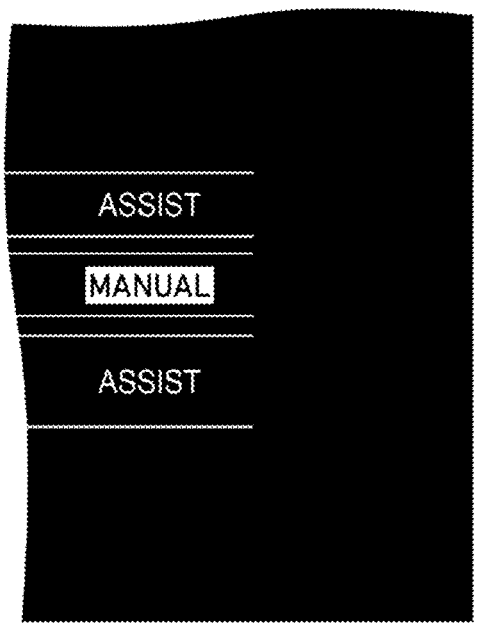
FIG. 7 is an image illustrating an example of display in which a color of a second text string has been inverted.

In cases in which determination is negative at step 108, processing transitions to step 112. At step 112, the display control ECU 42 performs inverted display of a closest action schedule item 72 in the action schedule item display region of the HUD 56 as illustrated in the examples of FIG. 6 and FIG. 7, and processing returns to step 100. Specifically, in cases in which the scheduled action is to be performed by manual driving, the second text string reads "MANUAL", and in the present exemplary embodiment, when "MANUAL" is displayed as the second text string to indicate manual driving, the second text string is displayed in a color with low brightness (for example black) and the background portion of the second text string is displayed in a color with high brightness (for example white).

In the present exemplary embodiment, the background of the overall display region of the HUD 56 is configured in a color with low brightness (for example black). In cases in which an action schedule item to be performed by autonomous driving is displayed, the color of the background portion (the portion inside the frame surrounding the second text string) of the second text string ("ASSIST" to indicate autonomous driving) is substantially the same as the background color of the overall display region of the HUD 56, and so the second text string does not appear especially prominent. By contrast, in cases in which an action schedule item to be performed by manual driving is displayed, the color of the background portion of the second text string ("MANUAL" to indicate manual driving) is different from the color of the second text string and from the background color of the overall display region of the HUD 56, thereby emphasizing display of the second text string. The occupant can thus easily be made aware of a timing at which operation by the occupant is required for the action schedule item 72 that is to be performed by manual driving. Note that setting different colors may, for example, be implemented by selecting a color for the background portion of the second text string that is a color separated from both the color of the second text string and the background color of the overall display region of the HUD 56 by at least a given specified distance in a particular color space.

In cases in which the single and closest action schedule item for which the scheduled location of the action is positioned within the distance L1 from the current position of the ego vehicle is less than the distance L2 from the current position of the ego vehicle, determination is negative at step 106 and processing transitions to step 114. At step 114, the display control ECU 42 determines whether or not the closest action schedule item is an action schedule item to be performed by autonomous driving. In cases in which determination is affirmative at step 114, processing transitions to step 116.

Figure 8:
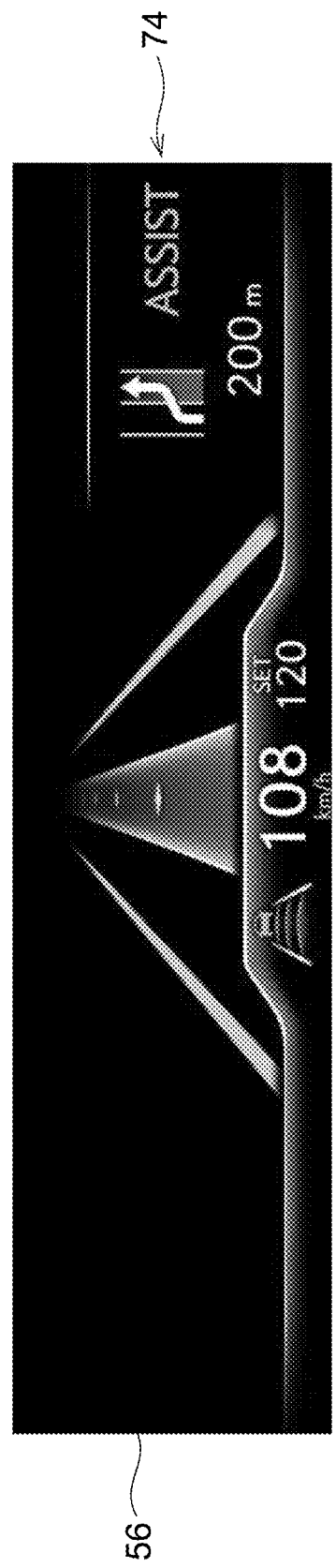
FIG. 8 is an image illustrating an example of display on an HUD.

At step 116, the display control ECU 42 performs enlarged display of a closest action schedule item 74 (second text string: "ASSIST") in the action schedule item display region of the HUD 56 as illustrated in the example of FIG. 8, and then processing returns to step 100. This enables the occupant to be made aware by the enlarged display of the action schedule item 74 that the scheduled location of the action is less than the distance L2 from the current position of the ego vehicle and is therefore imminent.

Figure 9:
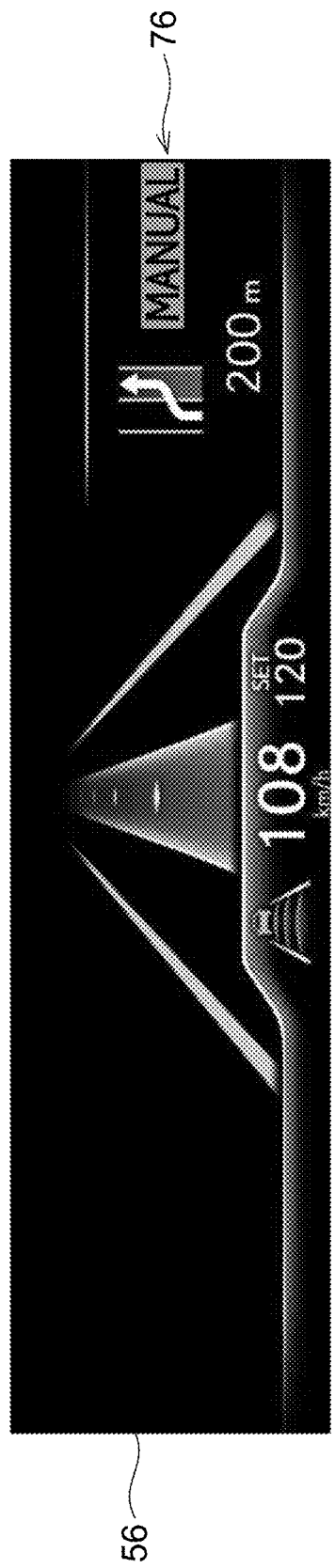
FIG. 9 is an image illustrating an example of display on an HUD.

In cases in which determination is negative at step 114, processing transitions to step 118. At step 118, the display control ECU 42 performs enlarged and inverted display of a closest action schedule item 76 (second text string: "MANUAL") on the action schedule item display region of the HUD 56 as illustrated in the example of FIG. 9, and then processing returns to step 100. This enables the occupant to be made aware by the enlarged display of the action schedule item 76 that the scheduled location of the action is less than the distance L2 from the current position of the ego vehicle and is therefore imminent. Moreover, the inverted display of the second text string ("MANUAL") of the action schedule item 76 enables the occupant to be easily made aware of a timing at which operation by the occupant is required for the action schedule item 76 that is to be performed by manual driving.

In cases in which the number of the action schedule items for which the scheduled location of the action corresponds to a position within the distance L1 from the current position of the ego vehicle is more than "1" at step 104, processing transitions from step 104 to step 120. At step 120, the display control ECU 42 determines whether or not the closest action schedule item, out of the plural action schedule items for which the scheduled location of the action corresponds to a position within the distance L1 from the current position of the ego vehicle, is the distance L2 from the current position of the ego vehicle or greater.

In cases in which determination is affirmative at step 120, processing transitions to step 122. At step 122, the display control ECU 42 determines whether or not the plural action schedule items for which the scheduled location of the action corresponds to a position within the distance L1 from the current position of the ego vehicle are all action schedule items to be performed by autonomous driving. In cases in which determination is affirmative at step 122, processing transitions to step 124.

At step 124, the display control ECU 42 displays n action schedule items in the action schedule item display region of the HUD 56, and processing returns to step 100. Note that n corresponds to the maximum number of action schedule items capable of being displayed in the action schedule item display region of the HUD 56. For example, the maximum display number n may be 2. Note that in cases in which the number of action schedule items for which the scheduled location of the action corresponds to a position within the distance L1 from the current position of the ego vehicle is greater than n, the closest n action schedule items are selected for display on the HUD 56.

In cases in which determination is negative at step 122, processing transitions to step 126. At step 126, the display control ECU 42 displays n action schedule items in the action schedule item display region of the HUD 56, and performs inverted display of any action schedule items included among the n action schedule items that are to be performed by manual driving. Processing then returns to step 100. This enables the occupant to be easily made aware of a timing at which operation by the occupant is required for any action schedule items included among the n action schedule items that are to be performed by manual driving.

In cases in which determination is negative at step 120, processing transitions to step 128. At step 128, the display control ECU 42 determines whether or not the plural action schedule items for which the scheduled location of the action corresponds to a position within the distance L1 from the current position of the ego vehicle are all action schedule items to be performed by autonomous driving. In cases in which determination is affirmative at step 128, processing transitions to step 130.

At step 130, the display control ECU 42 displays n action schedule items in the action schedule item display region of the HUD 56, and performs enlarged display of the closest action schedule item, and then processing returns to step 100. This enables the occupant to be made aware by the enlarged display of the closest action schedule item that the scheduled location of this action is less than the distance L2 from the current position of the ego vehicle and is therefore imminent.

Figure 10:
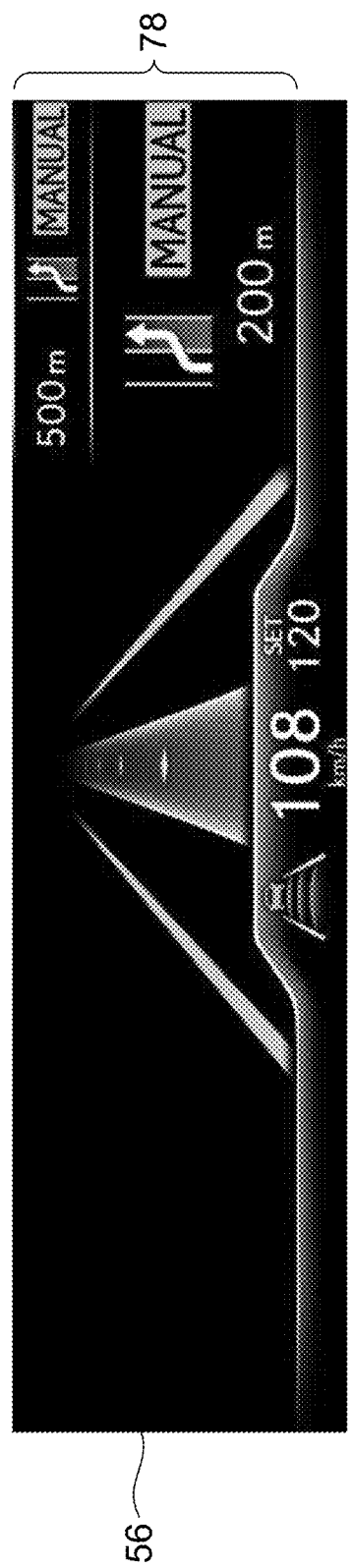
FIG. 10 is an image illustrating an example of display on an HUD.

In cases in which determination is negative at step 128, processing transitions to step 132. At step 132, the display control ECU 42 displays n action schedule items 78 in the action schedule item display region of the HUD 56 as illustrated in the example of FIG. 10, performing enlarged display of the closest action schedule item and inverted display of any action schedule items to be performed by manual driving included among the n action schedule items 78. This enables the occupant to be easily made aware of a timing at which operation by the occupant is required for any action schedule item to be performed by manual driving from among the n action schedule items 78. Moreover, this also enables the occupant to be made aware by the enlarged display of the closest action schedule item that the scheduled location of the action is less than the distance L2 from the current position of the ego vehicle and is therefore imminent.

Figure 11:
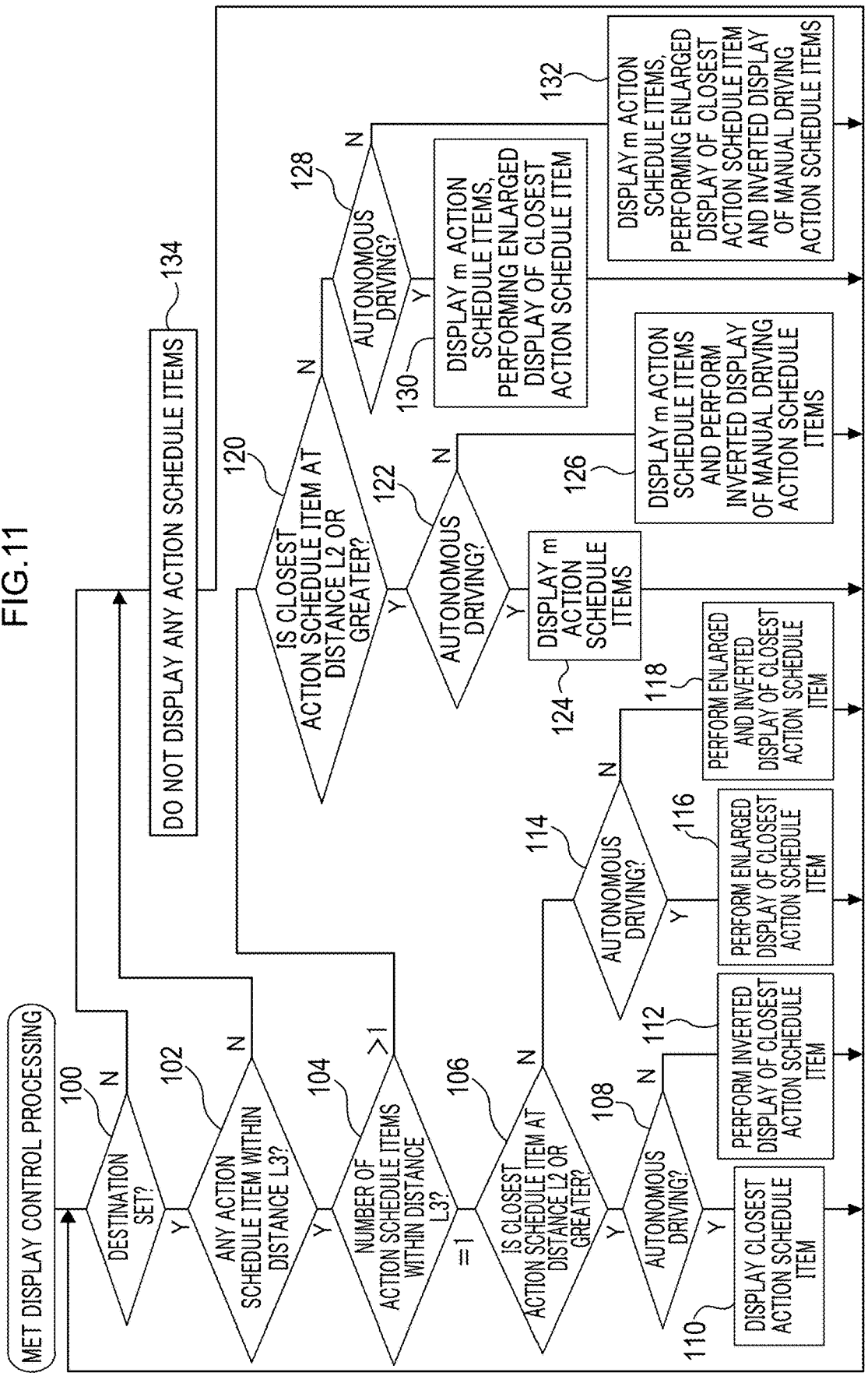
FIG. 11 is a flowchart illustrating an example of MET display control processing.

The display control ECU 42 also performs the MET display control processing illustrated in FIG. 11 while the ignition switch of the ego vehicle is on. The MET display control processing is similar to the HUD display control processing described above (see FIG. 3) with the exception of the points that action schedule items are displayed on the MET 58, a maximum display number m is applied instead of the maximum display number n, and a distance L3 is applied instead of the distance L1. Accordingly, equivalent steps are appended with the same reference numerals, and explanation thereof is omitted. Note that the maximum display number m is greater than the maximum display number n, and is for example set to three. Moreover, the distance L3 is equal to or greater than the distance L1, and is for example set to 20 km or 10 km. The distance L3 is an example of a first specified value.

The example of FIG. 2 illustrates a state in which a maximum display number m of action schedule items (i.e. three) are displayed on the MET 58 as action schedule items 80. Display is inverted for any action schedule item to be performed by manual driving included among the m action schedule items of the action schedule items 80 (see the second action schedule item in FIG. 2). Namely, for action schedule items to be performed by manual driving, the color of the background portion of the second text string ("MANUAL", indicating manual driving) differs from the color of the second text string and from the background color of the overall display region of the MET 58, thereby emphasizing display of the second text string. This enables the occupant to be easily made aware of a timing at which operation by the occupant is required for any action schedule item to be performed by manual driving from among the m action schedule items.

As described above, in the present exemplary embodiment, the action schedule item creation ECU 60 creates action schedule items demanded of the ego vehicle that is capable of switching between autonomous driving and manual driving. The HUD 56 and the MET 58 are provided inside the cabin of the ego vehicle. The display control ECU 42 displays the action schedule items created by the action schedule item creation ECU 60 on the HUD 56 and the MET 58, and emphasizes display of action schedule items to be performed by manual driving compared to display of action schedule items to be performed by autonomous driving. This enables the occupant to be easily made aware of a timing at which operation by the occupant is required.

In the present exemplary embodiment, the display control ECU 42 displays action schedule items on the HUD 56 and the MET 58 using information including text strings. The display control ECU 42 also emphasizes display of an action schedule item to be performed by manual driving relative to display of an action schedule item to be performed by autonomous driving by inverting the color of the text string and the color of the background portion of the text string. This enables the occupant to be clearly made aware of the distinction between autonomous driving and manual driving operations using a limited color palette. Moreover, even in the case of the HUD 56, for which screen contrast is difficult to secure for optical reasons, the occupant can be easily made aware of a timing at which operation by the occupant is required.

Moreover, in the present exemplary embodiment, the display control ECU 42 emphasizes display of an action schedule item to be performed by manual driving relative to display of an action schedule item that is to be performed by autonomous driving by setting the color of the background portion of the text string, this being is a portion inside a frame surrounding the text string, differently from the color of the text string and differently from the color of the background of at least a region of the display region of the HUD 56 or MET 58 in which the text string is displayed. This enables display of action schedule items to be performed by manual driving to be emphasized using a limited color palette.

Moreover, in the present exemplary embodiment, the action schedule item creation ECU 60 creates an action plan including plural action schedule items, and the display sections include the MET 58, serving as a first display section, and the HUD 56, serving as a second display section. Out of the action plan, the display control ECU 42 displays action schedule items for which the distance to the site where the action is to be performed is not greater than the distance L3 on the MET 58, and displays action schedule items for which the distance to the site where the action is to be performed is not greater than the distance L1, this being a shorter distance than the distance L3, on the HUD 56. Dividing display of the most imminent action schedule items and subsequent action schedule items between the MET 58 and the HUD 56 enables the occupant to be easily made aware of the action schedule items. Moreover, configuring the MET 58 as the first display section and configuring the HUD 56 as the second display section enables the amount by which the occupant has to shift their gaze in order to view the first display section or the second display section to be minimized.

Moreover, in the present exemplary embodiment, the action schedule item creation ECU 60 creates an action plan including plural action schedule items. In cases in which there are plural action schedule items to be displayed on the HUD 56 or the MET 58, the display control ECU 42 performs enlarged display of the action schedule item having the shortest distance to the site where the action is to be performed or having the shortest time until the action is to be performed relative to the other action schedule items. This enables the occupant to be easily made aware of the closest action schedule item, this being the highest priority, regardless of whether this action schedule item relates to autonomous driving or manual driving.

Explanation has been given regarding a format in which display of action schedule items to be performed by manual driving is emphasized relative to display of action schedule items to be performed by autonomous driving by inverting the color of the second text string and the color of the background portion of the second text string. However, emphasizing display of action schedule items to be performed by manual driving relative to display of action schedule items to be performed by autonomous driving is not limited to inverting the color of the second text string and color of the background portion of the second text string.

Figure 12:
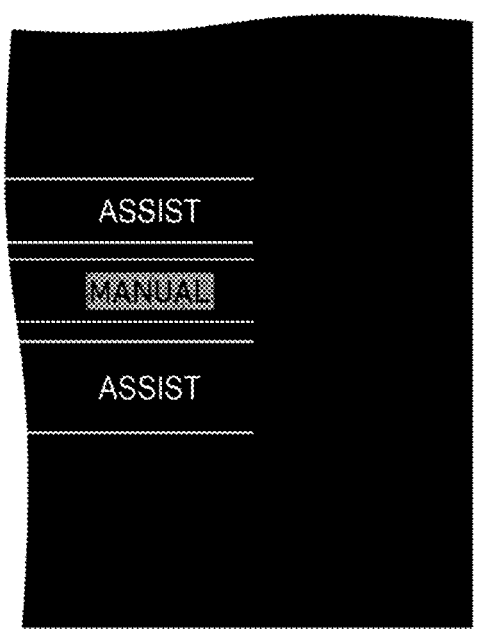
FIG. 12 is an image illustrating an example of display in which a color of a second text string has been changed.

For example, display of an action schedule item to be performed by manual driving may be emphasized relative to display of action schedule items to be performed by autonomous driving by changing the color of at least one out of the second text string or the background portion of the second text string (at least one out of brightness, hue, or saturation). FIG. 12 illustrates an example in which the color of the background portion of the second text string has been changed to red. This enables the occupant to be easily made aware of a timing at which operation by the occupant is required.

Changing the color of at least one out of the second text string or the background portion of the second text string may also be applied to the HUD 56. However, since the HUD 56 employs a smaller color palette and screen contrast is difficult to secure for optical reasons, this technique is preferably applied to the MET 58. Namely, the display control ECU 42 displays action schedule items on the display sections using information including a text string. In the case of the MET 58, display of action schedule items to be performed by manual driving are emphasized relative to display of action schedule items to be performed by autonomous driving by changing the color of at least one out of the second text string or the background portion of the second text string. In the case of the HUD 56, action schedule items to be performed by manual driving are emphasized relative to display of action schedule items to be performed by autonomous driving by inverting the color of the second text string and the color of the background portion of the second text string Adopting this format enables display to be emphasized in a manner corresponding to the respective characteristics of the MET 58 for which colors can be changed relatively simply, and of the HUD 56 that has a limited color palette.

Alternatively, for example, display of action schedule items to be performed by manual driving may be emphasized relative to display of action schedule items to be performed by autonomous driving by surrounding the second text string or the row containing the relevant action schedule item in a frame. Alternatively, for example, display of action schedule items to be performed by manual driving may be made to flash so as to be emphasized relative to display of action schedule items to be performed by autonomous driving.

Although explanation has been given regarding a format in which action schedule items for which the distance to the site of the action is not greater than the distance L3 are displayed on the MET 58, and action schedule items for which the distance to the site of the action schedule item is not greater than the distance L1, this being a shorter distance than the distance L3, are displayed on the HUD 56, there is no limitation thereto. For example, action schedule items for which the time until the action is to be performed is not greater than a first specified value may be displayed on the MET 58, while action schedule items for which the time until the action is to be performed is not greater than a second specified value, this being a smaller value than the first specified value, may be displayed on the HUD 56.

Figure 13:
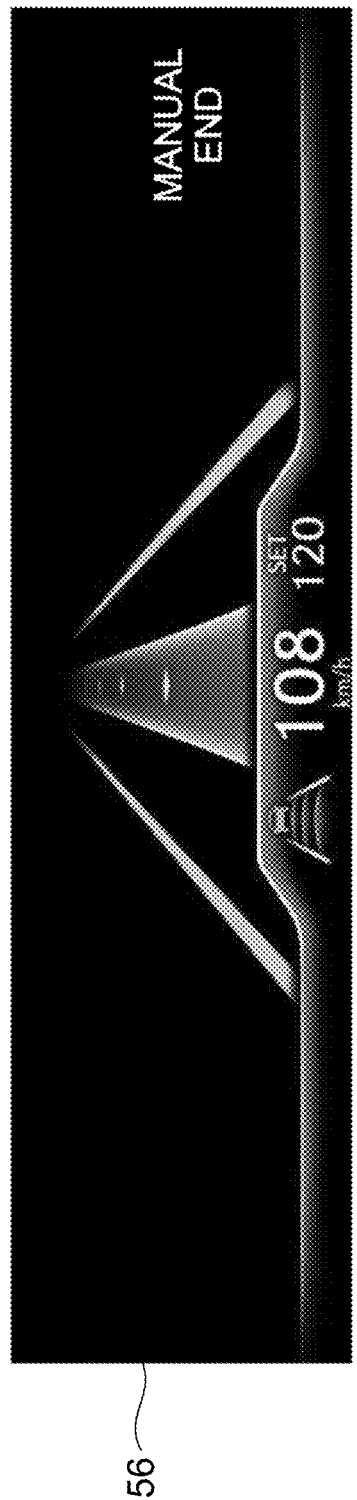
FIG. 13 is an image illustrating an example of display indicating the end of manual driving.

Although explanation has been given regarding a format in which no particular display is performed when manual driving by the occupant has ended, there is no limitation thereto. For example, the display control ECU 42 may perform display indicating an end to manual driving on at least one out of the HUD 56 or the MET 58 in cases in which a site of an action schedule item performed manually by the occupant has been passed or a duration of an action schedule item performed manually by the occupant has been exceeded. An example of a display indicating the end of manual driving is illustrated in FIG. 13. This enables the end of manual driving to be clearly conveyed, enabling the occupant to cease their operation with confidence.

Although explanation has been given regarding a format in which action schedule item display is performed on each of the HUD 56 and the MET 58, there is no limitation thereto. Configuration may be made in which action schedule items are displayed on either one of the HUD 56 or the MET 58. Display sections are not limited to the HUD 56 or the MET 58, and, for example, action schedule items may be displayed on a central monitor provided at a central portion of the instrument panel of the vehicle.

Moreover, although explanation has been given regarding an example in which the autonomous driving ECU 34 performs some driving operations during manual driving, and the occupant of the ego vehicle executes the remaining driving operations, there is no limitation thereto. For example, configuration may be made in which the occupant of the ego vehicle performs all driving operations when in a manual driving mode.

Although explanation has been given regarding a format in which the background colors of the overall display regions of the HUD 56 and the MET 58 are set to a color with low brightness (for example black), there is no limitation thereto, and other colors may be employed therefor. Moreover, there is no limitation to employing a uniform background color for the overall display regions of the HUD 56 and the MET 58, and the background colors of the display regions of the HUD 56 and the MET 58 may be locally varied. In such cases, the color of a portion inside a frame surrounding the second text string is preferably different from the color of the second text string and different from the background color of at least a region in which the second text string is displayed on the display region of the HUD 56 or the MET 58. This enables the display of action schedule items to be performed by manual driving to be emphasized with a limited color palette.

A format has been described in which the display control program 54, serving as an example of vehicle display control program according to the present disclosure, is pre-stored (installed) in the storage section 48 of the display control ECU 42. However, the vehicle display control program according to the present disclosure may be provided in a format recorded onto a non-transitory recording medium such as a CD-ROM, a DVD-ROM, a memory card, an HDD, or an SSD.

What is claimed is:

1. A vehicle display control device comprising:
a first processor configured to display an action schedule item created by a second processor configured to create an action schedule item demanded of a vehicle capable of switching between autonomous driving and manual driving on a display device provided inside a cabin of the vehicle, and to emphasize display of the action schedule item to be performed by manual driving compared to display of the action schedule item to be performed by autonomous driving, wherein
the second processor is configured to create an action plan including a plurality of the action schedule items;
the display device includes a first display device and a second display device; and
out of the action plan, the first processor is further configured to display on the first display device an action schedule item for which a distance to a site where the action is to be performed or a time until the action is to be performed is not greater than a first specified value, and to display on the second display device an action schedule item for which a distance to a site where the action is to be performed or a time until the action is to be performed is not greater than a second specified value that is smaller than the first specified value.

2. The vehicle display control device of claim 1, wherein the first processor is further configured to display the action schedule item on the display device using information including a text string, and to emphasize display of the action schedule item to be performed by manual driving relative to display of the action schedule item to be performed by autonomous driving by inverting a color of the text string and a color of a background portion of the text string.

3. The vehicle display control device of claim 2, wherein the first processor is further configured to emphasize display of the action schedule item to be performed by manual driving relative to display of the action schedule item to be performed by autonomous driving by setting a color of a background portion of the text string that is a portion inside a frame surrounding the text string differently from a color of the text string and differently from a color of a background of at least a region of a display region of the display device in which the text string is displayed.

4. The vehicle display control device of claim 3, wherein the first processor is further configured to display on the display device a display indicating an end to manual driving in cases in which a site of an action schedule item performed manually by an occupant has been passed or a duration of an action schedule item performed manually by the occupant has been exceeded.

5. The vehicle display control device of claim 3, wherein:
in cases in which there are a plurality of the action schedule items to display on the display device, the first processor is configured to perform enlarged display of an action schedule item having the shortest distance to a site where the action is to be performed or the shortest time until the action relative to other action schedule items.

6. The vehicle display control device of claim 2, wherein the first processor is further configured to display on the display device a display indicating an end to manual driving in cases in which a site of an action schedule item performed manually by an occupant has been passed or a duration of an action schedule item performed manually by the occupant has been exceeded.

7. The vehicle display control device of claim 2, wherein:
in cases in which there are a plurality of the action schedule items to display on the display device, the first processor is configured to perform enlarged display of an action schedule item having the shortest distance to a site where the action is to be performed or the shortest time until the action relative to other action schedule items.

8. The vehicle display control device of claim 1, wherein:
the first display device is a meter display and the second display device is a head-up display; and
the first processor is further configured to
display the action schedule item on the display device using information including a text string, and
in the case of the meter display, emphasize display of the action schedule item to be performed by manual driving relative to display of the action schedule item to be performed by autonomous driving by changing a color of at least one out of the text string or a background portion of the text string, and
in the case of the head-up display, emphasize display of the action schedule item to be performed by manual driving relative to display of the action schedule item to be performed by autonomous driving by inverting a color of the text string and a color of a background portion of the text string.

9. The vehicle display control device of claim 1, wherein the first processor is further configured to display on the display device a display indicating an end to manual driving in cases in which a site of an action schedule item performed manually by an occupant has been passed or a duration of an action schedule item performed manually by the occupant has been exceeded.

10. The vehicle display control device of claim 1, wherein the first display device is a meter display, and the second display device is a head-up display.

11. The vehicle display control device of claim 1, wherein:
in cases in which there are a plurality of the action schedule items to display on the display device, the first processor is configured to perform enlarged display of an action schedule item having the shortest distance to a site where the action is to be performed or the shortest time until the action relative to other action schedule items.

12. A vehicle display control method to cause a computer to execute processing comprising:
displaying an action schedule item created by a processor configured to create an action schedule item demanded of a vehicle capable of switching between autonomous driving and manual driving on a display device provided inside a cabin of the vehicle; and
emphasizing display of the action schedule item to be performed by manual driving compared to display of the action schedule item to be performed by autonomous driving, wherein
the processor is configured to create an action plan including a plurality of the action schedule items;
the display device includes a first display device and a second display device; and
the processing further comprises:
out of the action plan, displaying on the first display device an action schedule item for which a distance to a site where the action is to be performed or a time until the action is to be performed is not greater than a first specified value, and displaying on the second display device an action schedule item for which a distance to a site where the action is to be performed or a time until the action is to be performed is not greater than a second specified value that is smaller than the first specified value.

13. A non-transitory computer readable storage medium stored with a vehicle display control program that causes a computer to execute processing comprising:
displaying an action schedule item created by a processor configured to create an action schedule item demanded of a vehicle capable of switching between autonomous driving and manual driving on a display device provided inside a cabin of the vehicle; and
emphasizing display of the action schedule item to be performed by manual driving compared to display of the action schedule item to be performed by autonomous driving, wherein
the processor is configured to create an action plan including a plurality of the action schedule items;
the display device includes a first display device and a second display device; and
the processing further comprises:
out of the action plan, displaying on the first display device an action schedule item for which a distance to a site where the action is to be performed or a time until the action is to be performed is not greater than a first specified value, and displaying on the second display device an action schedule item for which a distance to a site where the action is to be performed or a time until the action is to be performed is not greater than a second specified value that is smaller than the first specified value.

14. A vehicle display system comprising:
a second processor configured to create an action schedule item demanded of a vehicle capable of switching between autonomous driving and manual driving;
a display device provided inside a cabin of the vehicle; and
a first processor configured to display the action schedule item created by the second processor on the display device, and to emphasize display of the action schedule item to be performed by manual driving compared to display of the action schedule item to be performed by autonomous driving, wherein
the second processor is configured to create an action plan including a plurality of the action schedule items;
the display device includes a first display device and a second display device; and
out of the action plan, the first processor is further configured to display on the first display device an action schedule item for which a distance to a site where the action is to be performed or a time until the action is to be performed is not greater than a first specified value, and to display on the second display device an action schedule item for which a distance to a site where the action is to be performed or a time until the action is to be performed is not greater than a second specified value that is smaller than the first specified value.

* * * * *